May 26, 1964

W. A. MORGAN 3,134,938

RECIPROCATING MOTOR CONTROL SYSTEM

Filed July 5, 1962

INVENTOR.
WALTER A. MORGAN,
BY Frank S. Troidl.

ATTORNEY.

United States Patent Office 3,134,938
Patented May 26, 1964

3,134,938
RECIPROCATING MOTOR CONTROL SYSTEM
Walter A. Morgan, Baytown, Tex., assignor, by mesne assignments, to Esso Research and Engineering Company, Elizabeth, N.J., a corporation of Delaware
Filed July 5, 1962, Ser. No. 207,528
4 Claims. (Cl. 318—130)

This invention relates to magnetic pumps. More particularly, this invention is a new and improved magnetic pump system including a power supply which has no moving parts.

Currently, magnetically actuated pumps are used for precise investigations such as where gaseous reactants are circulated through reaction zones or absorbents. One difficulty, however, with these currently utilized magnetically actuated pumps is that they include as a part of the power supply a cam driven microswitch for alternately energizing a pair of power coils to reciprocate an iron core used to pump the fluid. This results in the following problems:

(1) Severe arcing occurs at the mechanical switch contacts. This causes the contacts to wear out quickly, and they must be replaced.

(2) The cam driven timer generates a great deal of mechanical noise. Since the pumping units are frequently used close to operating personnel, the mechanical noise is undesirable. It is very distracting and produces operator fatigue.

In order to eliminate the above problems, I have invented an improved magnetically actuated pump which does not include any moving parts. The elimination of severe arcing at switch contacts has been accomplished by the provision of transistor switches. Also, the electromechanical timer has been replaced with an electronic or solid state timing unit. This eliminates the aforementioned mechanical noise.

Briefly described, the magnetic pump system includes a direct current power supply. A transistor switch arrangement is included in an electrical circuit. The transistor switch serves to control the flow of electrical current to a pair of power coils. The switches are controlled to alternately energize the power coils to reciprocate the piston used to pump fluid through the pump. The operation of the transistor switches is controlled by an electrical timing unit.

The invention, as well as its many advantages, will be further understood by reference to the following detailed description and drawing in which.

Figure 1:
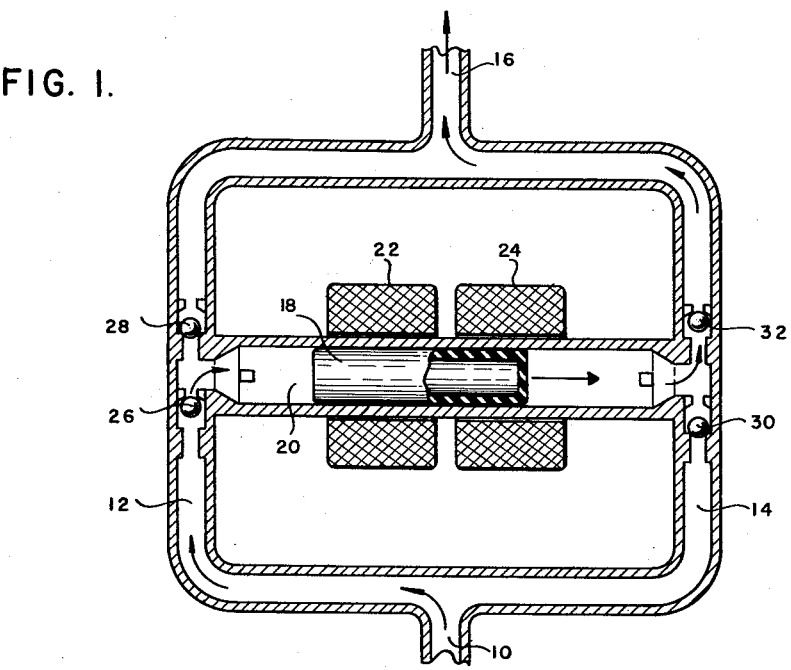
FIG. 1 is a schematic view of a magnetically actuated pump.

Referring to the drawing, and particularly to FIG. 1, a pump is shown having a fluid inlet 10, branch lines 12 and 14, and a fluid outlet 16.

A piston 18 having a sealed-in iron core is positioned within the horizontal conduit 20. The piston is reciprocated within the conduit 20 by the alternate energizing of solenoids 22 and 24.

Ball-check valves 26 and 28 are located within branch line 12. Ball-check valves 30 and 32 are located within branch line 14.

To explain the operation of the magnetic pump, assume fluid is located in line 14 between ball-check valves 30 and 32. Assume further that the piston 18 is moved from the position shown in FIG. 1 in the direction of the arrow. The movement of piston 18 in the direction of the arrow will cause ball-check valve 30 to remain seated and unseat ball-check valve 32, thus causing fluid to be pumped from the outlet 16. At the same time, a vacuum is created behind the piston 18. The vacuum causes ball-check valve 26 in branch line 12 to unseat. Ball-check valve 28, however, remains seated. Thus, fluid is flowed through branch line 12 and trapped in the space between ball-check valves 26 and 28.

When the piston 18 returns to the position shown in FIG. 1, ball-check valve 26 is seated; and ball-check valve 28 is unseated to flow liquid from outlet 16. At the same time, ball-check valve 30 in branch line 14 is unseated; and fluid is flowed through branch line 14. The above-described cycle is continuously repeated.

Figure 2:
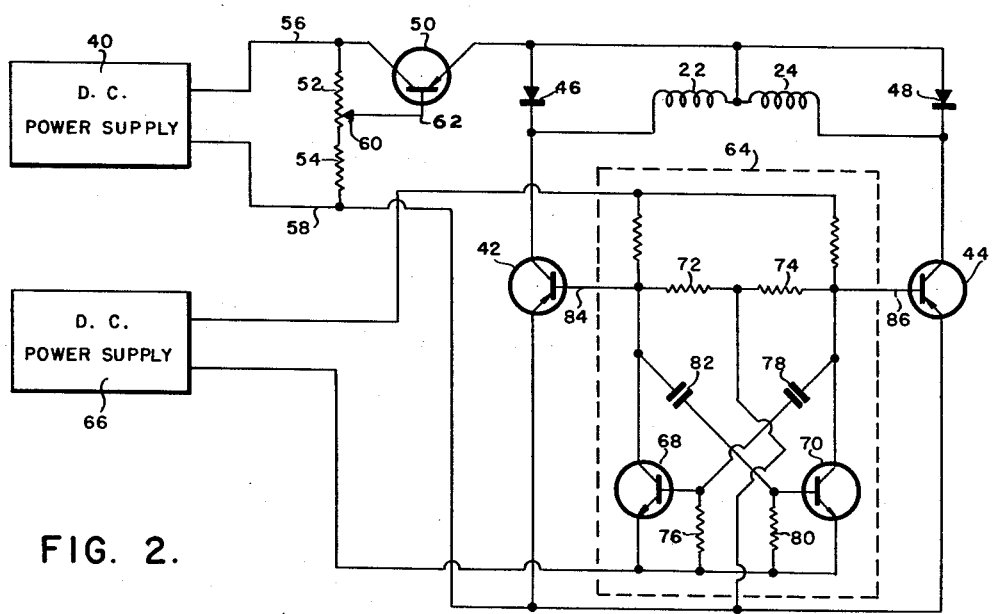
FIG. 2 is a view partially in block diagram and partially in electrical schematic showing the electrical system.

The alternate energizing of power coils 22 and 24 is accomplished by the circuit shown in FIG. 2. The circuit includes a series arrangement of a direct current power supply 40, and power coil 22 and transistor switch 42 in parallel with power coil 24 and transistor switch 44.

Diodes 46 and 48 are connected in parallel with power coils 22 and 24, respectively.

The series arrangement also includes a current adjustment circuit including the transistor 50 connected between the direct current power supply 40 and the power coils 22 and 24. A resistor 52 and a resistor 54 are connected across lines 56 and 58. A wiper 60 is adapted for movement along resistor 52 to vary the bias on the base 62 of the transistor 50.

The switches 42 and 44 are alternately switched on by means of timing unit 64. Power for the timing unit 64 is supplied by direct current power supply 66. The alternate switching of the transistor switches 42 and 44 results in the alternate energizing of the power coils 22 and 24.

The transistors 42 and 44 are used in the switching mode. Each transistor acts as either a dead short (switch on condition) or an an open circuit (switch off condition). Since the transistor conducts current only during periods when the voltage drop across the transistor is essentially zero (switch on condition), the power dissipation in the transistor is very small; hence, relatively small and inexpensive power transistors are satisfactory for this application.

The diodes 46 and 48 are connected across the pump coils 22 and 24 to protect the transistors 42 and 44 from large voltage transients during the switching interval.

The timing unit 64 determines the rate at which the current is switched between the two coils 22 and 24 and provides the power to actuate the transistor switches 42 and 44. The timing unit 64 is preferably a "free-running" multivibrator consisting of transistors 68 and 70 and associated passive elements. The collector of transistor 68 is connected to the base of transistor 42 and thus provides the control signal and power for switching transistor 42. Transistors 44 and 70 are similarly interconnected. The base current for the power transistors is returned to the emitter circuit through resistors 72 and 74. This circuit provides adequate switch drive power with a minimum of interaction between switching rate and coil current. The frequency is determined by the resistor-capacitor combinations 76 and 78, and 80 and 82. Preferably, the frequency of the timing unit 64 is chosen to produce a one cycle per second repetition rate.

The electrical connections of the timing unit 64 to transistor switches 42 and 44 are such that the output from timing unit 64 to base 84 of transistor switch 42 causes the transistor switch 42 to be forward biased while at the same time the output to base 86 of transistor switch 44 causes the transistor switch 44 to be reverse biased. When the transistor switch 42 is reverse biased, the transistor switch 44 is forward biased.

The transistor 50 is connected between the power supply 40 and the output load (pump coils 22 and 24). Since the output load resistance is constant, the output current can be adjusted by varying the emitter voltage on transistor 50. This is accomplished by varying the transistor base current by means of wiper 60 on resistor 52.

In operation, the timing unit 64 continuously and alternately switches the transistor switches 42 and 44 to an on state to thereby alternately energize the power coils 22 and 24. The alternate energizing of the power coils 22 and 24 causes the piston 18 to reciprocate in horizontal line 20. The reciprocation of piston 18 causes the fluid to be pumped from the fluid outlet 16.

The entire pumping system has no moving parts in the electrical system. Hence, there is no severe arcing; and there is no mechanical noise.

I claim:

1. An electromagnetic system comprising: a magnetic member adapted for reciprocal movement; a series arrangement of a direct current power supply, and a first power coil and first transistor switch in parallel with a second power coil and second transistor switch, said power coils being disposed adjacently with a common axis and said magnetic member supported for reciprocal movement along that axis; and electrical timing means connected to said transistor switches and adapted to continuously and alternately switch the transistor switches on to thereby alternately energize the power coils whereby the magnetic member is reciprocated.

2. An electromagnetic system in accordance with claim 1 wherein a first diode is connected in parallel with the first power coil and a second diode is connected in parallel with the second power coil.

3. An electromagnetic system in accordance with claim 2 wherein the series arrangement includes a current adjustment circuit including a transistor connected between the direct current power supply and the power coils.

4. An electromagnetic system in accordance with claim 3 wherein the electrical timing means is a free-running multivibrator.

References Cited in the file of this patent

UNITED STATES PATENTS

| | | |
|---|---|---|
| 461,295 | Van Depoele | Oct. 13, 1891 |
| 2,323,440 | Baird | July 6, 1943 |
| 2,356,071 | MacDonald et al. | Aug. 15, 1944 |
| 2,690,128 | Basilewsky | Sept. 28, 1954 |
| 2,759,104 | Skellett | Aug. 14, 1956 |
| 2,761,392 | Parker | Sept. 4, 1956 |
| 2,787,712 | Priebe et al. | Apr. 2, 1957 |
| 2,874,315 | Reichert | Feb. 17, 1959 |
| 3,004,199 | Sakson | Oct. 10, 1961 |
| 3,013,162 | Antista | Dec. 12, 1961 |